United States Patent
Juhola et al.

(10) Patent No.: US 12,436,427 B1
(45) Date of Patent: Oct. 7, 2025

(54) UNIFORMLY POLARIZED BACKLIGHT

(71) Applicant: Distance Technologies Oy, Helsinki (FI)

(72) Inventors: Mikko Juhola, Muurla (FI); Petri Savolainen, Espoo (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/185,889

(22) Filed: Apr. 22, 2025

(51) Int. Cl.
*G02F 1/1335* (2006.01)

(52) U.S. Cl.
CPC .. *G02F 1/133607* (2021.01); *G02F 1/133514* (2013.01); *G02F 1/133528* (2013.01)

(58) Field of Classification Search
CPC .................................................. G02F 1/133607
See application file for complete search history.

(56) References Cited

U.S. PATENT DOCUMENTS

| | | | | |
|---|---|---|---|---|
| 2015/0185584 A1* | 7/2015 | Smith | ............ | G02B 27/283 349/196 |
| 2020/0142213 A1* | 5/2020 | Sato | ............ | G02F 1/13363 |
| 2024/0329418 A1* | 10/2024 | Iijima | ............ | G02B 27/0172 |

* cited by examiner

*Primary Examiner* — Edmond C Lau
(74) *Attorney, Agent, or Firm* — ZIEGLER IP LAW GROUP, LLC.

(57) ABSTRACT

A backlight unit for a liquid crystal display device includes an array of light-emitting elements. Each element includes a light source configured to emit light laterally relative to an optical axis of the backlight unit. A collimator is arranged on an optical path of emitted light rays in at least one direction to collimate the light rays. A first prism is positioned after the collimator to reflect a portion of the collimated light rays with one polarization orientation along the optical axis and transmit another portion with the opposite polarization orientation. A half-wave plate, arranged after the first prism, rotates the polarization of the transmitted light. A second prism, positioned after the half-wave plate, reflects the rotated light along the optical axis.

8 Claims, 7 Drawing Sheets

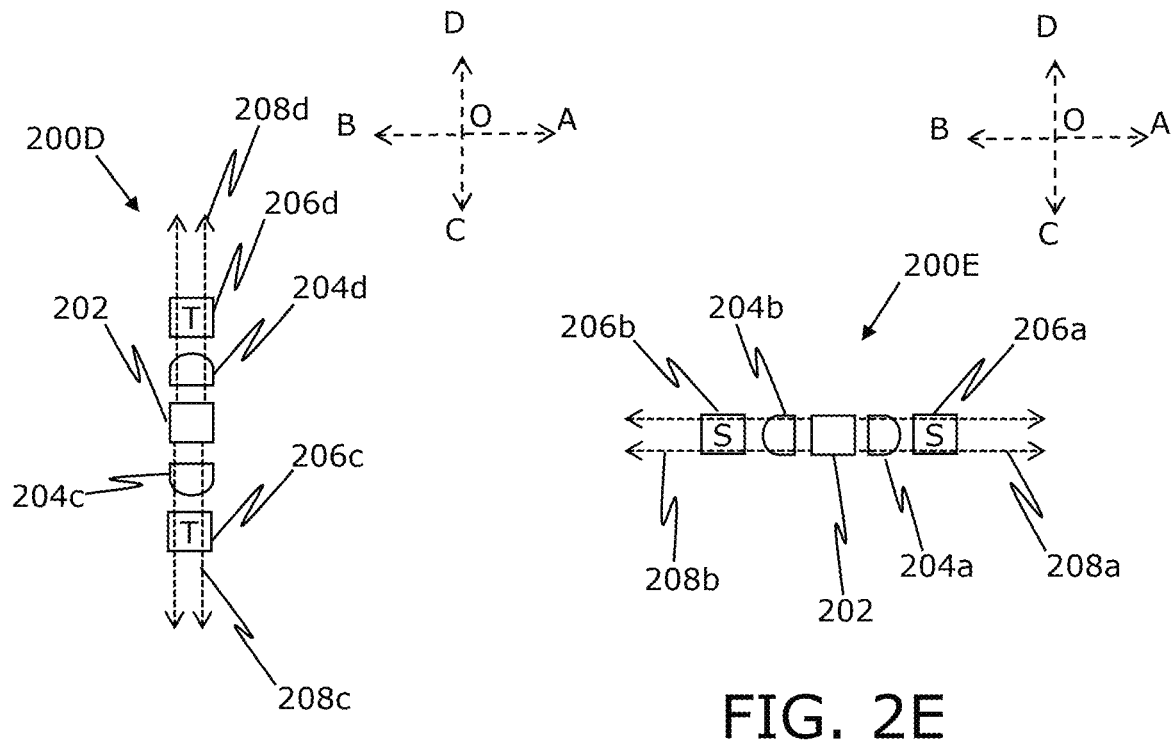
FIG. 2D
FIG. 2E
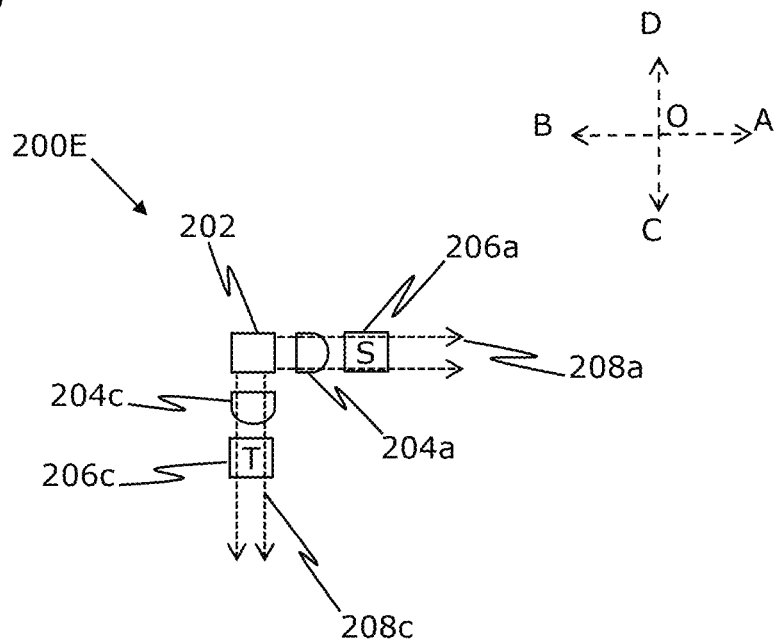
FIG. 2F

UNIFORMLY POLARIZED BACKLIGHT

TECHNICAL FIELD

The present disclosure relates to backlight units for liquid crystal display devices, particularly those configured to produce uniformly polarized illumination. The present disclosure also relates to liquid crystal display devices incorporating the aforesaid backlight units and systems utilizing the display devices to generate synthetic light fields.

BACKGROUND

Globally, LCD devices find widespread use in applications such as projection systems and autostereoscopic displays. Such LCD devices comprise backlight units that enable illumination through an arrangement of light-emitting elements and optical components. However, polarization losses in conventional LCD devices reduce the brightness of displayed images, leading to inefficiencies.

Conventional LCD devices comprise backlight units that generate unpolarized light, which passes through a polarizer to attain a required polarization state for image formation. Such a process discards approximately half of the emitted light, causing substantial energy loss and reduced brightness. Additionally, autostereoscopic display systems comprising parallax barriers or lens arrays lose more brightness. The division of light into multiple viewing zones lowers intensity per zone. Such a reduction limits overall display performance.

Further, achieving uniform polarization across the display panel presents challenges. Inconsistent polarization creates brightness and contrast variations. Such variations degrade image quality. Conventional LCD backlights require secondary polarizers and other optical elements. Such additions increase optical inefficiencies and reduce system performance.

Therefore, an improved backlight unit must enhance light efficiency. Such a unit must also maintain uniform polarization. These improvements allow higher brightness and superior image quality in LCD devices.

SUMMARY

The present disclosure provides a backlight unit, an LCD device and a system that produce uniformly polarized illumination for LCD-based display applications. Such a backlight unit emits collimated light with a uniform polarization state, eliminating polarization losses and enhancing brightness. The LCD device comprises such a backlight unit to improve light efficiency and image quality while maintaining consistent polarization across a display panel. Such a system utilizes the LCD device to generate synthetic light fields with optimized luminance and contrast for various display applications. The appended independent claims define such a system, while the appended dependent claims set out advantageous features.

Throughout the description and claims of this specification, the words "comprise", "include", "have" and "contain" and variations of these words, for example "comprising" and "comprises", mean "including but not limited to" and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 2A-2H show simplified top views of exemplary light-emitting elements, in accordance with various embodiments of the present disclosure;

DETAILED DESCRIPTION OF EMBODIMENTS

Figure 1:
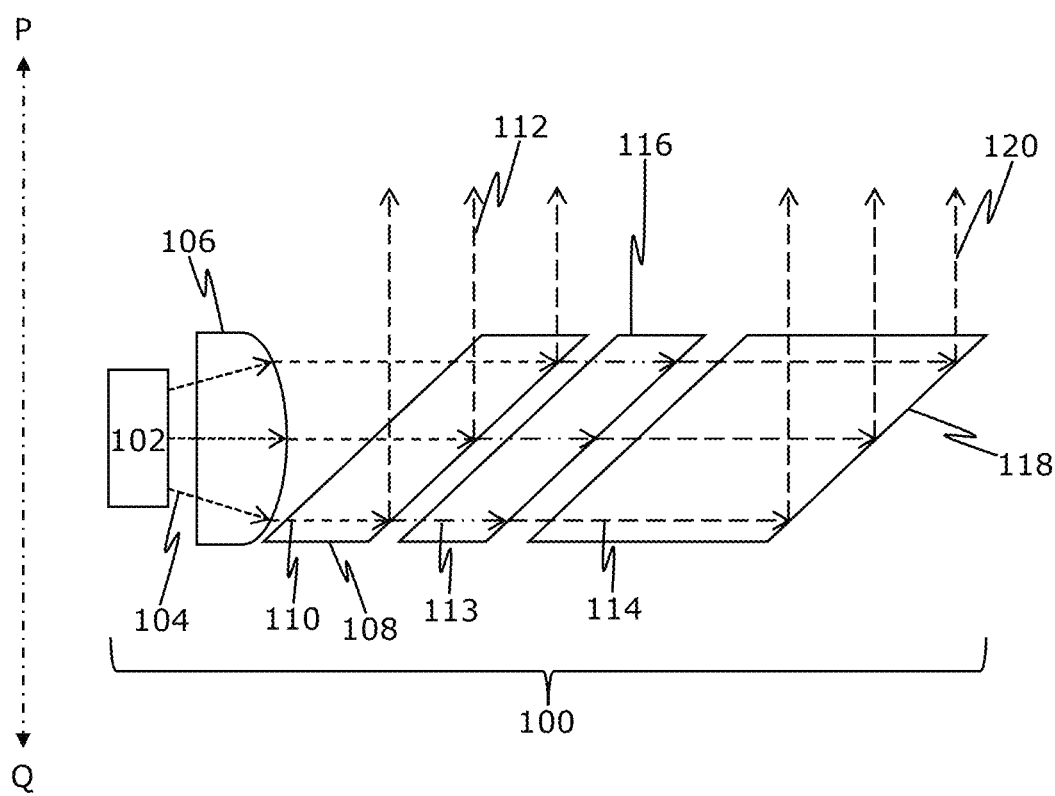
FIG. 1 shows a simplified top view of a backlight unit, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a backlight unit for a liquid crystal display device, the backlight unit comprising an array of light-emitting elements, wherein a given light-emitting element comprises:

- a light source configured to emit light rays laterally relative to an optical axis of the backlight unit, wherein the light rays are emitted laterally in at least one direction;
- a collimator arranged on an optical path of light rays emitted in an individual one of the at least one direction, to collimate the light rays;
- a first prism arranged on said optical path after the collimator, configured to reflect a given portion of the collimated light rays having one of a first polarization orientation and a second polarization orientation along the optical axis of the backlight unit and to transmit another portion of the collimated light rays having another of the first polarization orientation and the second polarization orientation;
- a half-wave plate arranged on said optical path after the first prism, configured to rotate a polarization orientation of the another portion of the collimated light rays from the another of the first polarization orientation and the second polarization orientation to the one of the first polarization orientation and the second polarization orientation; and
- a second prism arranged on said optical path after the half-wave plate, configured to reflect the another portion of the collimated light rays having the one of the first polarization orientation and the second polarization orientation along the optical axis of the backlight unit.

In a second aspect, the present disclosure provides a liquid crystal display device comprising:

- the backlight unit;
- a linear polarizer having the another of the first polarization orientation and the second polarization orientation, arranged on an optical path of the backlight unit;

a liquid crystal (LC) layer arranged between the backlight unit and the linear polarizer, the LC layer comprising a plurality of LC cells;

a drive circuit employed to individually control the plurality of LC cells of the LC layer; and a processor configured to:

generate drive signals for controlling the plurality of LC cells of the LC layer; and send the drive signals to the drive circuit, wherein the plurality of LC cells of the LC layer are controlled individually by the drive circuit using the drive signals, to adjust a polarization of light passing therethrough, for producing a synthetic light field.

In a third aspect, the present disclosure provides a system comprising:

the liquid crystal display device comprising;

the backlight unit;

the linear polarizer having the another of the first polarization orientation and the second polarization orientation, arranged on an optical path of the backlight unit;

the liquid crystal (LC) layer arranged between the backlight unit and the linear polarizer, the LC layer comprising a plurality of LC cells; and the drive circuit employed to individually control the plurality of LC cells of the LC layer;

an optical combiner arranged on an optical path of the liquid crystal display device and on an optical path of a real-world light field of a real-world environment; and at least one processor configured to:

generate or retrieve an image to be displayed via the liquid crystal display device; and send the image to the liquid crystal display device, wherein the liquid crystal display device is configured to display the image for producing a synthetic light field and wherein the optical combiner is employed to reflect the synthetic light field towards eyes of at least one user, whilst optically combining the real-world light field with the synthetic light field.

The present disclosure describes the backlight unit that is implemented in liquid crystal display (LCD) devices for applications requiring high luminance and efficient light utilization. The term "backlight unit" as used throughout the present disclosure relates to a light-emitting assembly configured to provide uniform illumination to an LCD panel of the LCD device. The term "liquid crystal display device" or "LCD device" as used throughout the present disclosure relates to a display system that utilizes liquid crystal material to modulate light and produce visual outputs. The LCD device comprises the backlight unit, the LCD panel and associated driving electronics. The LCD device incorporates the backlight unit along with the linear polarizer and the liquid crystal (LC) layer. The backlight unit, the linear polarizer and the LC layer of the LCD device enable precise modulation of light transmission. The system further integrates the optical combiner with the LCD device comprising the backlight unit. The facilitating alignment of displayed content with real-world imagery. The arrangement of the collimator, the first prism, the half-wave plate and the second prism within the backlight unit eliminates polarization-based light losses by directing both polarization components of emitted light rays toward the LCD panel instead of discarding one polarization state. The term "collimator" as used throughout the present disclosure relates to an optical component configured to align light rays emitted from the light source into a controlled beam with reduced angular divergence. The collimator converges an angular spread of incident light rays using optical structures such as refractive or reflective elements. The term "first prism" as used throughout the present disclosure relates to an optical component configured to selectively reflect and transmit collimated light rays based on a polarization orientation thereof. The first prism is arranged along the optical path of the collimated light rays emitted from the collimator, opposite to the light source. The utilization of both polarization components increases brightness while maintaining optical efficiency. The term "half-wave plate" as used throughout the present disclosure relates to an optical retardation component configured to alter the polarization state of the light rays transmitted from the first prism by introducing a phase shift between orthogonal polarization components. Thus, when the transmitted portion of the collimated light rays enters the half-wave plate, the phase shift causes the polarization orientation of the light to rotate by 90 degrees, converting the polarization orientation from the another of the first polarization orientation and the second polarization orientation to the one of the first polarization orientation and the second polarization orientation. The term "second prism" as used throughout the present disclosure relates to an optical component configured to redirect light rays along the optical axis of the backlight unit after undergoing polarization rotation by the half-wave plate. The second prism, like the first prism, enables reflection of received light rays based on polarization properties thereof. The efficient propagation of light rays within the backlight unit allows the LCD device to achieve high luminance with lower power input, thereby, allowing the LCD device to reduce power consumption. The emitted light rays are aligned and directed efficiently by the arrangement of the collimator, the first prism, the half-wave plate, and the second prism. The controlled alignment and direction of light facilitate uniform illumination across the LCD panel.

The synthetic light field is reflected towards the eyes of the user by the optical combiner. The optical combiner also optically combines the real-world light field with the synthetic light field. The optical combining of the real-world light field and the synthetic light field facilitates augmented content to remain visible under varying ambient lighting conditions. The backlight unit comprises the array of light-emitting elements. The term "light-emitting elements" as used throughout the present disclosure relates to components configured to generate and emit light rays for illuminating the LCD panel of the LCD device. The light-emitting elements comprise semiconductor-based light sources such as LEDs that produce optical radiation when electrically energized. The light-emitting elements are selected based on required emission wavelength, luminance characteristics and efficiency to attain desired display performance. Throughout the present disclosure the term "array of light-emitting elements" refers to light-emitting elements arranged in a predefined format. The array of light-emitting elements is responsible for generating illumination for the LCD panel. The emitted light rays form a basis of the visual content presented by the LCD device.

The given light-emitting element comprises the light source configured to emit light rays laterally relative to an optical axis of the backlight unit. The term "light source" as used throughout the present disclosure relates to an optical component configured to generate and emit light rays for illuminating the LCD panel of the LCD device. The light source is implementable as an LED, a mini-LED, a micro-LED or an organic light-emitting diode (OLED). The light source is selected based on efficiency, luminance and spectral characteristics thereof to achieve a desired display performance of the LCD device. The light source generates optical radiation when electrically energized, providing necessary illumination for the LCD panel. The light rays are emitted laterally in at least one direction, propagating within a plane perpendicular to the optical axis of the backlight unit. The term "laterally" as used throughout the present disclosure relates to the emission of light rays in a direction perpendicular to the optical axis of the backlight unit. The term "optical axis" as used throughout the present disclosure relates to a trajectory along which the light rays propagate towards the LCD panel from the backlight unit. The optical axis extends along the Z-axis. The light rays are emitted in at least one direction perpendicular to the optical path of the backlight unit. The at least one direction lies within the XY plane, considering the Z-axis as the optical path of the backlight unit. In a specific implementation, the light rays propagate in four different directions within the XY plane. The lateral emission of light rays enables the emitted light rays to interact correctly with the optical components arranged along the optical path of the emitted light, maintaining proper alignment within the backlight unit. The lateral emission of light rays in at least one direction enables improved angular uniformity by enabling the emitted light rays to be evenly distributed across the LCD panel. The alignment of the emitted light rays prevents brightness inconsistencies by directing illumination uniformly, minimizing unwanted variations in intensity. The term "at least one direction" as used throughout the present disclosure relates to an emission pathway that is perpendicular to the optical path of the backlight unit. The emitted light rays propagate in a direction lying within the plane that is orthogonal to the optical axis. Further, the efficient utilization of emitted light rays reduces power consumption by enabling a greater proportion of emitted light rays to contribute to image formation. Brightness is increased while maintaining optical efficiency due to the reduction in optical losses, allowing high luminance to be achieved by the LCD device without excessive energy input. The collimator is included in the given light-emitting element and is arranged on the optical path of light rays emitted in the individual one of the at least one direction. The collimator aligns the emitted light rays into a structured beam before further propagation within the backlight unit. The collimation of the emitted light rays enables a controlled propagation direction, preventing excessive angular divergence of the light rays.

Consistent light propagation is maintained by the collimation of the emitted light rays, facilitating uniform illumination across the LCD panel. The alignment of the emitted light rays allows even distribution of illumination, minimizing brightness inconsistencies. Further, the collimation of the emitted light rays reduces unnecessary scattering, enabling a greater proportion of the emitted light rays to reach the LCD panel and improving optical efficiency. Energy efficiency is maintained while brightness is increased due to the reduction in optical losses, enabling high luminance to be achieved by the LCD device without additional power consumption. The first prism is also included in the given light-emitting element and is arranged on the optical path after the collimator.

The first prism is configured to reflect the given portion of the collimated light rays having one of the first polarization orientation and the second polarization orientation along the optical axis of the backlight unit and to transmit another portion of the collimated light rays having another of the first polarization orientation and the second polarization orientation. The term "first polarization orientation" as used throughout the present disclosure relates to a polarization state of light waves oscillating within a first predefined plane, whereas the term "second polarization orientation" as used throughout the present disclosure relates to a polarization state of light waves oscillating in a plane perpendicular to the first polarization orientation. For illustrative purposes, the first polarization orientation corresponds to a T-polarization selective prism and the second polarization orientation corresponds to an S-polarization selective prism. However, it will be appreciated that the first polarization orientation can correspond to the S-polarization selective prism and the second polarization orientation can correspond to the T-polarization selective prism.

The reflection and transmission of the collimated light rays by the first prism and the second prism enable polarization-based separation of light rays. The selective reflection of the given portion of the collimated light rays enables one polarization state to be directed toward the LCD panel without losses, maintaining brightness. The transmission of the another portion of the collimated light rays allows the subsequent optical components to process and align the polarization states, allowing both of the S- and T-polarization selective prisms to contribute to image formation.

The selective reflection and transmission of the collimated light rays by the first prism, the half-wave plate and the second prism in a synergistic manner facilitate both polarization components to contribute to illumination, preventing unnecessary absorption of one polarization state. The preservation of both the T- and S-polarization selective prisms increases brightness by directing a greater proportion of the emitted light rays toward the LCD panel. The collimator aligns the emitted light rays into a structured beam before further propagation within the backlight unit. The collimation of the emitted light rays enables a controlled propagation direction, thereby preventing excessive angular divergence of the light rays. The collimation of the emitted light rays maintains consistent light propagation. Uniform illumination across the LCD panel is facilitated.

The given light-emitting element also comprises the half-wave plate arranged on the optical path after the first prism. The half-wave plate is configured to rotate the polarization orientation of the another portion of the collimated light rays from the another of the first polarization orientation and the second polarization orientation to the one of the first polarization orientation and the second polarization orientation. For illustrative purposes, when the another portion of the collimated light rays corresponds to the T-polarization selective prism, the half-wave plate rotates the polarization orientation to the S-polarization selective prism and vice versa.

The half-wave plate rotates the polarization orientation of the collimated light rays transmitted by the first prism such that the polarization orientation of the rotated light rays aligns parallel to the polarization orientation of the light rays reflected by the first prism. The polarization orientation of the light rays is rotated by the half-wave plate. Thus, the light rays reflected by the first prism and the light rays rotated by the half-wave plate correspond to the same polarization orientation, thereby, enabling the light rays having the same polarization orientation to further propagate within the backlight unit. The light rays passing through the half-wave plate having the rotated polarization orientation is utilized efficiently due to the alignment of the polarization orientation thereof with the polarization orientation of the light rays reflected by the first prism.

Further, both polarization components contribute to illumination due to the rotation of the polarization orientation by the half-wave plate. The light loss associated with differences in polarization orientations is prevented. Moreover, brightness is increased by preserving both the first and the second polarization orientations. Thus, the light rays having the same polarization orientation due to reflection by the first prism and rotation by the half-wave plate is directed toward the LCD panel. Further, power consumption is reduced by the conversion of the polarization state. The need for additional energy input to compensate for variations in polarization orientations is eliminated.

The given light-emitting element further comprises the second prism arranged on said optical path after the half-wave plate, configured to reflect the another portion of the collimated light rays having the one of the first polarization orientation and the second polarization orientation along the optical axis of the backlight unit. For illustrative purposes, when the another portion of the collimated light rays corresponds to the S-polarization selective prism after rotation by the half-wave plate of the T-polarization selective prism, the second prism reflects the S-polarized light rays along the optical axis of the backlight unit. The collimated light rays are reflected by the second prism. The reflected portion processed by the first prism and the rotated portion processed by the half-wave plate acquire the same polarization orientation before further propagation within the backlight unit. Efficient utilization of the emitted light rays is enabled by the alignment of the polarization orientations. Absorption of one polarization component is prevented. The second prism reflects the collimated light rays, allowing both polarization orientations to contribute to illumination. Light loss associated with differences in polarization orientations is prevented. The preservation of the S-polarization selective prism increases brightness by directing all emitted light rays toward the LCD panel.

The LCD device comprises the backlight unit and the linear polarizer. The linear polarizer is arranged on the optical path of the backlight unit and has the another of the first polarization orientation and the second polarization orientation. The linear polarizer is responsible for selectively transmitting light rays having a specific polarization orientation while attenuating or blocking light rays having an orthogonal polarization orientation.

For illustration purpose, the collimated light rays with S-polarization selective prism are directed toward the linear polarizer. The linear polarizer selectively transmits the S-polarized light rays while attenuating the remaining components which misalign with the desired polarization orientation. The linear polarizer is arranged along the optical path of backlight unit. Only appropriately polarized light rays propagate within the LCD device. The light transmission control is maintained.

Contrast of the selective transmission of light rays is improved through the linear polarizer. Sharpness and clarity of displayed image is retained, while unwanted light leakage is prohibited. Polarization-based light filtering enables effective modulation of the transmitted light rays by the optical components arranged along the optical path of the transmitted light. Image formation and brightness are efficiently controlled. The transmission of polarized light rays maintains uniform illumination across the LCD panel. The transmission of the polarized light rays having the same polarization orientation enables to prevent brightness variations across the LCD panel, thereby, providing uniform illumination.

The LCD device also comprises the LC layer arranged between the backlight unit and the linear polarizer. The LC layer comprises the plurality of LC cells. The polarization state of the transmitted light rays is modulated by the LC layer. The alignment of LC molecules is selectively modified based on the applied electrical signals. The LC layer is arranged between the linear polarizer and backlight unit. Accurate control over the light polarization is facilitated before reaching the linear polarizer. Each LC cell within the LC layer, individually, adjusts the polarization state of the transmitted light. Contrast and brightness are altered at a pixel-level.

In the LC layer, contrast is enhanced by the modulation of light. Each LC cell selectively controls transmission of light, thereby prohibiting unintended light leakage. Further, the ability to adjust polarization orientation individually across the plurality of LC cells enables accurate image rendering. Clarity and detail in the displayed content are maintained. The controlled polarization adjustments also contributes to uniform illumination across the LCD panel. Variations in brightness are minimized.

The LCD device also comprises the drive circuit employed to individually control the plurality of LC cells of the LC layer. The drive circuit applies drive signals to the plurality of LC cells, allowing selective modulation of the polarization of light passing through the LC layer. The independent control of the plurality of LC cells prevents unintended light leakage, and maintenance of clarity and sharpness of the displayed image. The polarization state adjustment for each LC cell allows regulation of brightness and contrast across the LCD panel. The light transmission modulation at the level of individual LC cells facilitates uniform illumination to reduce brightness variations and enhancement of overall visual quality of the displayed image. Moreover, the LCD device comprises the processor configured to generate drive signals for controlling the plurality of LC cells of the LC layer and send the drive signals to the drive circuit. The plurality of LC cells of the LC layer are controlled individually by the drive circuit using the drive signals, to adjust the polarization of light rays passing therethrough, for producing the synthetic light field.

The generation of the drive signals by the processor enables each LC cell to receive precise control signals to modulate the polarization of the transmitted light. The adjustment of the polarization state by the plurality of LC cells enables controlled variation in brightness and contrast, enabling accurate rendering of the synthetic light field.

The generation of the drive signals by the processor facilitates the modulation of the polarization state to occur as required, preventing inconsistencies in the displayed image. The adjustment of the polarization of light by the plurality of LC cells maintains clarity by preserving contrast levels. Further, power consumption is reduced by modulating the polarization of light. Only the required portions of the transmitted light rays contributes to image formation. Adjustments in the polarization state across the LC layer improves uniformity in light transmission. Variations in brightness across the LCD panel are minimized.

In the third aspect, the system comprises the LCD device, the optical combiner and at least one processor. The optical combiner is arranged on the optical path of the LCD device and the optical path of the real-world light field of the real-world environment. The synthetic light field produced by the LCD device is reflected by the optical combiner, while the real-world light field is transmitted. Virtual content is integrated with the real-world environment.

The arrangement of the optical combiner along the optical path of the LCD device and the real-world light field enables the synthetic light field to be directed toward the eyes of at least one user while maintaining visibility of the surrounding environment. The optical combiner is positioned to facilitate controlled overlay of virtual content onto real-world objects. Further, the augmented content appears aligned with the surrounding environment.

The optical combiner is integrated into the system to facilitate visibility of the synthetic light field under varying ambient lighting conditions. Light is reflected toward the user without significant optical losses. Further, alignment between the synthetic light field and the real-world light field is maintained, minimizing variations in brightness and contrast. The optical combination of the synthetic light field with the real-world light field allows spatial consistency of the virtual content. Spatial consistency of the virtual content is enabled, supporting applications that integrate virtual content with the surrounding environment.

The system further comprises at least one processor configured to generate or retrieve an image to be displayed via the liquid crystal display device and send the image to the LCD device. The liquid crystal display device is configured to display the image for producing the synthetic light field. The optical combiner is employed to reflect the synthetic light field towards eyes of at least one user, whilst optically combining the real-world light field with the synthetic light field.

The generation or retrieval of the image by the at least one processor allows the LCD device to produce the synthetic light field based on the required visual content to be displayed. The transmission of the image to the LCD device facilitates controlled modulation of the displayed visual content, allowing virtual elements to be presented with the required brightness and contrast.

The optical combiner reflects the synthetic light field, thereby, directing the virtual content toward the user while maintaining visibility of the real-world environment. Further, the synthetic light field is merged with the real-world light field, thus facilitating alignment of the displayed virtual content with real-world objects. Further, alignment between the synthetic light field and the real-world light field reduces positioning discrepancies. The augmented content remains consistently visible across different lighting conditions. As a result, variations in visibility caused by ambient lighting are minimized.

In some implementations, the first prism, the half-wave plate and the second prism may be implemented without any air gap therebetween. In such implementations, the first prism, the half-wave plate and the second prism can be implemented as an integrated optical assembly.

Optionally, the at least one direction includes a first direction, a second direction, a third direction and a fourth direction, the first direction being opposite to the second direction, the third direction being opposite to the fourth direction, the first direction being perpendicular to the third direction. The term "first direction" as used throughout the present disclosure relates to a trajectory for emission of light rays oriented along a first axis within a plane orthogonal to the optical axis of the backlight unit, wherein the emitted light rays propagate in an upward orientation. The term "second direction" as used throughout the present disclosure relates to a trajectory for emission of light rays oriented along the first axis in an opposite orientation to the first direction, wherein the emitted light rays propagate in a downward orientation. The term "third direction" as used throughout the present disclosure relates to an emission pathway oriented along a second axis within the same plane, wherein the emitted light rays propagate in a lateral orientation towards one side (such as a right-hand side). The term "fourth direction" as used throughout the present disclosure relates to an emission pathway oriented along the second axis in an opposite orientation to the third direction, wherein the emitted light rays propagate in a lateral orientation towards an opposite side (such as a left-hand side).

The first direction and the second direction are arranged so that emitted light rays in the first direction remains opposite to emitted light rays in the second direction. The third direction and the fourth direction are arranged so that emitted light rays in the third direction remains opposite to emitted light rays in the fourth direction. Further, due to the perpendicular relationship between the first axis and the second axis, emitted light rays propagating along the first direction and the second direction remains distinct from emitted light rays propagating along the third direction and the fourth direction.

In a specific implementation, the polarization state of emitted light rays propagating along the first direction and the second direction corresponds to T-polarized light, wherein an electric field thereof oscillates parallel to a plane of incidence. Further, the polarization state of emitted light rays propagating along the third direction and the fourth direction corresponds to S-polarized light, wherein an electric field thereof oscillates perpendicular to the plane of incidence. In another specific implementation, the polarization states are reversed, such that the first direction and the second direction correspond to S-polarized light while the third direction and the fourth direction correspond to T-polarized light. The aforesaid orientation of the T-polarized and S-polarized light optimizes interaction with polarization-selective optical components of the backlight unit, including the first prism and the second prism, facilitating efficient light manipulation within the LCD device.

Optionally, for the first direction and the second direction, corresponding first prisms are configured to reflect a portion of the collimated light rays having the first polarization orientation. Further, for the third direction and the fourth direction, corresponding first prisms are configured to reflect a portion of the collimated light rays having the second polarization orientation. The first direction and the second direction are opposite to each other and the third direction and the fourth direction are opposite to each other, with the third direction being perpendicular to the first direction.

A first prism is positioned along the optical paths of the collimated light rays for each of the four emission directions, such that a first prism is arranged in the first direction, a first prism is arranged in the second direction, a first prism is arranged in the third direction and a first prism is arranged in the fourth direction, to facilitate polarization-dependent reflection. The first prism corresponding to the first direction and the second direction are arranged to partially reflect the collimated light rays having the first polarization orientation. Further, the first prism corresponding to the third direction and the first prism the fourth direction are configured to reflect a portion of the collimated light rays having the second polarization orientation, enabling the light rays to be similarly directed along the optical axis towards the LCD panel.

The arrangement of the first prism in each of four directions orthogonally to each other enables selective polarization control based on direction of emission of light rays from the light source. The four first prisms arranged in each of the four directions separate the collimated light rays in each of the four directions based on the polarization orientation of the emitted light. The separation optimizes interaction with optical components (such as the half-wave plates and the second prisms) placed along the optical path of the light transmitted from the respective first prisms. Further, enabling portions of the collimated light rays from the first and second directions to be reflected based on the first polarization orientation and portions of the collimated light rays from the third and fourth directions to be reflected based on the second polarization orientation, facilitates the backlight unit to maximize optical efficiency while maintaining uniform brightness distribution across the LCD panel.

Optionally, the backlight unit further comprises a polarization-preserving diffuser arranged on an optical path of the given portion of the collimated light rays and the another portion of the collimated light rays. The term "polarization-preserving diffuser" as used throughout the present disclosure relates to an optical component configured to scatter incident light while maintaining the polarization orientation thereof. The polarization-preserving diffuser controls light scattering through microstructures or volume-scattering mechanisms. The scattering of the light by the polarization-preserving diffuser increases an angular spread of the emitted light rays, enabling uniform illumination across the LCD panel. Further, unlike conventional diffusers that introduce random polarization mixing, the polarization-preserving diffuser preserves the polarization orientation of a given portion of the collimated light rays and the another portion of the collimated light rays. The polarization-preserving diffuser mitigates localized intensity variations (by way of diffusing light while sustaining polarization) to minimize the display artifacts, for example, non-uniform brightness regions or visible light patterns which are caused by collimated illumination. The first prism, second prism and half-wave plate enable sync in polarization and directional control. The polarization-preserving diffuser alters the spatial distribution of the light rays to obtain visually consistent and uniform illumination profile to enable high-quality image rendering where brightness control is required such as LCD devices.

Optionally, the polarization-preserving diffuser is positioned between the collimator and the first prism to maintain intensity distribution of collimated light rays before polarization separation by the first prism. Optionally, the polarization-preserving diffuser is positioned toward the reflected portion of collimated light, where the polarization-preserving diffuser interacts with light rays reflected by the first prism or the second prism. Thus, the polarization-preserving diffuser allows reflected light rays from the first prism and/or second prism to spread evenly across the viewing area while maintaining polarization state thereof. The polarization-preserving diffuser enables maintenance of the polarization state of the reflected light rays to reduce the angular variations in brightness and contrast, and also the unwanted artifacts such as hot spots or the non-uniform lighting patterns. The diffusion of the reflected light rays enhances display brightness and improves viewing quality without compromising polarization-dependent modulation in the LCD panel.

Optionally, the liquid crystal display device further comprises a colour filter array arranged between the LC layer and the linear polarizer. The term "colour filter array" as used throughout the present disclosure relates to an optical component configured to selectively transmit specific wavelength bands of light to enable colour image formation. The colour filter array uses a patterned arrangement of wavelength-selective filters. Each filter corresponds to a given colour selected from red, green or blue. In a specific implementation, the colour filter array comprises an RGB subpixel pattern that enables the LCD device to generate full-colour images through additive colour mixing. For example, when light rays exit the LC layer, the light rays pass through specific filter regions, thereby each subpixel transmits only an allotted colour component. The linear polarizer utilizes the filtered light rays for final image rendering, therefore emitted light rays retain a controlled polarization state. In an alternative implementation, the colour filter can be arranged on optical path before or after the LC layer. Arranging the colour filter before the LC layer in LCD device provides technical benefit of minimizing cross-talk between different colour channels by allowing the light entering the LC layer to be filtered into specific colour components. Further arrangement of the colour filter before LC layer provides technical benefit of enhancing colour fidelity and reducing colour bleeding to sharpen image quality. The colour filter positioned before the LC layer also allows uniform LC modulation, provides another technical benefit of maintaining accurate colour representation. Arranging the colour filter after the LC layer provides technical benefit of increasing brightness by allowing the LC layer to modulate the entire spectrum of light simultaneously. Arranging the colour filter after the LC layer provides technical benefit of minimizing optical losses, as the light intensity remains higher during modulation.

Optionally, the colour filter can be an interference-based thin film filter or an absorption filter. The interference-based comprises multiple layers of dielectric materials with varying refractive indices, which provides a technical benefit of achieving high transmission efficiency and wavelength selectivity by exploiting constructive and destructive interference. The interference-based thin film filter also provides technical benefit of maintaining high colour purity with minimal loss of light intensity. Additionally, interference-based thin film filter provides technical benefit of allowing improved brightness and compatibility with light source that have power at a narrower spectrum. The absorption filter provides technical benefit of simpler fabrication and integration with the LCD structure. The interference-based thin film filter in combination with narrow spectral light sources provides technical benefit of optimal performance in LCD devices, particularly in applications such as distance displays where the colour gamut is less critical. Combination of interference-based thin film filter and narrow spectral light sources provides technical benefits of maintaining high luminance and brightness in the display by minimizing optical losses through effective reflection of non-target wavelengths. The combination of interference-based thin film filter and narrow spectral light sources provides technical benefit of improved colour purity and accuracy by allowing precise wavelength selectivity and reducing unwanted light interference for maintaining vivid image projection, particularly in distance displays where brightness is prioritized over a wide colour gamut. Further, the combination allows energy optimizing through efficient use of the emitted light, thereby lowering power consumption while sustaining optimal display performance. Additionally, the combination of interference-based thin film filter and narrow spectral light sources provides technical benefit of consistent colour output over prolonged use, contributing to display longevity and stable image quality. The colour filter array is arranged between the LC layer and the linear polarizer ascertains that modulated light passing through the LC layer is filtered into multiple colour components, before arriving at the linear polarizer. The positioning of the colour filter array facilitates each LC cell to modulate light intensity, independently, for the given colour, for precise control over colour reproduction. Further, the colour filter array reduces unwanted absorption and spectral overlap, enhancing colour accuracy while retaining high brightness efficiency.

The colour filter array facilitates high-quality colour rendering by ascertaining light modulated by the LC layer is optimally filtered into distinct spectral components. The LCD device produces a full spectrum of colours by way of controlled modulation of transmitted light rays by managing alignment of the colour filters with individual LC cells. Further, the positioning of the colour filter array between the LC layer and the linear polarizer facilitates colour mixing to occur at a subpixel level, preventing unwanted spectral interference and enabling consistent colour fidelity across the LCD device.

Optionally, the system further comprises a tracker and a multiscopic optical element. The at least one processor is configured to determine a relative location of a first eye and of a second eye of the at least one user with respect to the optical combiner, by utilising the tracker, generate the image as a light field image, based on the relative location of the first eye and of the second eye with respect to the optical combiner and control the multiscopic optical element, based on the relative location of the first eye and of the second eye with respect to the optical combiner, to direct light corresponding to a first set of pixels of the light field image and light corresponding to a second set of pixels of the light field image to produce a first part and a second part of the synthetic light field, respectively, for the first eye and the second eye. The term "tracker" as used throughout the present disclosure relates to a sensing module configured to detect and determine the positional coordinates of the first eye and the second eye of at least one user with respect to the optical combiner. The tracker (such as Infrared (IR) Sensor, high-speed camera etc.) operates by capturing real-time spatial data through image-based tracking, infrared sensing scanning techniques. The real-time spatial data is processed to calculate the gaze direction, interpupillary distance and relative head orientation of the user, enabling visual content to be aligned correctly with the field of view of the user.

The term "multiscopic optical element" as used throughout the present disclosure relates to an optical component configured to direct different portions of the synthetic light field to each eye of the at least one user, enabling stereoscopic or multiscopic depth perception. The multiscopic optical element operates by selectively modulating the angular distribution of emitted light, facilitating a first portion of the light field image to be directed towards the first eye and a second portion to be directed towards the second eye. In a specific implementation, the multiscopic optical element comprises a lenticular array, a parallax barrier or a dynamic wavefront control system, allowing adaptive light field projection based on the relative position of the user.

The term "light field image" as used throughout the present disclosure relates to a computationally generated image that encodes directional and spatial light information to create depth and parallax effects. The light field image comprises multiple perspective views, structured as pixel sets corresponding to different viewing angles. The processor uses the real-time spatial data from the tracker to adjust the rendered light field image. The aforesaid adjustment allows the projected content to dynamically align with the head position and gaze direction of the user.

The system maintains spatial accuracy of the synthetic light field by incorporating the tracker and the multiscopic optical element. The incorporation of the tracker and the multiscopic optical element provides a natural and immersive viewing experience. The system is particularly beneficial for AR headsets, advanced HUDs and mixed-reality training systems. Further, accurate depth perception enhances usability and engagement of the system in such applications of AR headsets, advanced HUDs and mixed-reality training systems.

A person skilled in the art can recognize that the half-wave plate can be fabricated from birefringent materials such as quartz or synthetic polymers, for example, birefringent polyvinyl film. The fabrication process involves aligning the molecular structure of the material to achieve the desired birefringence, allowing the phase shift to occur upon interaction with polarized light. Thus, when the polarized light interacts with the half-wave plate, the birefringent material causes the polarization orientation of the light to rotate by 90 degrees, thereby converting the polarization orientation from one polarization state to another.

A person skilled in the art can also understand that the first prism and/or second prism can be cartesian polarizing beam splitter (PBS) prism or fabricated from birefringent multilayer reflective polarizing films, comprising stacked layers of biaxial birefringent polymer materials. These films are produced by uniaxially stretching polymer layers to create a controlled refractive index distribution that selectively reflects one polarization state while transmitting the orthogonal polarization state. The birefringent reflecting polarizing film prism integrates multiple thin-film layers of materials such as polyethylene naphthalate (PEN) and copolymers to achieve high reflectance for s-polarized light while maintaining high transmission for p-polarized light. The cartesian PBS prism can be constructed using wide-angle birefringent polarizing films, combining thin polymer layers with specific refractive indices to provide polarization stability across varying incident angles. Thus, when the polarized light enters the prism, the multilayer film produces polarization reflection based on constructive and destructive interference, thereby effectively separating the polarization components while maintaining consistent transmission properties.

Experimental Part

To evaluate the performance benefits of the backlight unit according to the aforementioned first aspect of the present disclosure, a comparative test was conducted using a simulated LCD backlight configuration. The simulation focused on measuring irradiance from the backlight unit at a distance of 1 meter, under two configurations: with and without collimation of the emitted light in the X-direction.

In a baseline configuration without collimation in the X-direction, the light source emitted light laterally relative to the optical axis of the backlight unit without any optical concentration in the X-direction. In the baseline configuration, the emitted light exhibited a wide angular spread in the XY plane, resulting in a measured peak irradiance of 0.00547 $W/cm^2$ at 1 meter.

In another configuration with collimation in the X-direction, the light source emitted light laterally relative to the optical axis, with optical concentration in both the X-direction and the Y-direction. In this configuration, the lateral angular spread of the emitted light was reduced, focusing the light into a narrower emission cone in the X-direction. This directional confinement effectively concentrated the light within a smaller solid angle, resulting in a measured peak irradiance of 0.0112 $W/cm^2$ at the same 1-meter distance. Notably, the measured peak irradiance improved by more than twofold.

This increase demonstrates that the collimation achieved by the backlight unit significantly enhances the directional brightness of the emitted light. The narrowing of the emission angle results in more light being directed along the optical axis, improving perceived luminance and projection clarity in high-ambient-light applications, such as automotive head-up displays. Importantly, this enhancement is achieved without increasing the power input, underscoring the LCD device's optical efficiency.

DETAILED DESCRIPTION OF THE DRAWINGS

FIG. 1 shows a simplified section view of a light-emitting element 100 of a backlight unit, in accordance with an embodiment of the present disclosure. The backlight unit comprises an array of light-emitting elements, for example as shown. Further, the light-emitting element 100 comprises a light source 102 configured to emit light rays 104 laterally relative to an optical axis P-Q of the backlight unit (and of the light-emitting element 100). The light rays 104 (indicated as three square-dotted) are emitted laterally in at least one direction and propagate horizontally into the collimator 106 and at an angle with respect to each other relate to the light rays 104 that are emitted laterally in at least one direction. The light-emitting element 100 further comprises a collimator 106 arranged on an optical path of light rays 104 emitted in an individual one of the at least one direction, to collimate the light rays 104. Moreover, the backlight unit comprises a first prism 108 arranged on said optical path after the collimator 106, configured to reflect a given portion 112 (indicated as three dashed arrows) of the collimated light rays 110 (indicated as three dashed arrows) having one of a first polarization orientation and a second polarization orientation along the optical axis P-Q of the light-emitting element 100 and to transmit another portion 114 of the collimated light rays 110 having another of the first polarization orientation and the second polarization orientation. The collimated light rays 110 are shown to be propagating horizontally from the collimator 106 into the first prism 108 that are parallel to each other relate to the collimated light rays 110. The given portion 112 of the collimated light rays 110 are shown to be propagating vertically from the first prism 108 that are parallel to each other relate to the reflected given portion 112 of the collimated light rays 110. Moreover, the three arrows 113 (indicated as long-dashed, double-dotted arrows) shown to be propagating horizontally from the first prism 108 that are parallel to each other relate to another portion 113 of the collimated light rays 110 that are transmitted by the first prism 108. The light-emitting element 100 also comprises a half-wave plate 116 arranged on said optical path after the first prism 108, configured to rotate a polarization orientation of the another portion 114 of the collimated light rays 110 from the another of the first polarization orientation and the second polarization orientation to the one of the first polarization orientation and the second polarization orientation. Further, the three arrows 114 (indicated as three dashed arrows) shown to be propagating horizontally from the half-wave plate 116 that are parallel to each other relate to the rotated another portion 114 of the collimated light rays 110. Further, the light-emitting element 100 comprises a second prism 118 arranged on said optical path after the half-wave plate 116, configured to reflect the another portion 120 of the collimated light rays 110 having the one of the first polarization orientation and the second polarization orientation along the optical axis P-Q of the light-emitting element 100. The three arrows 120 (indicated as three dashed arrows) shown to be propagating vertically from the second prism 118 that are parallel to each other relate to the another portion 120 of the collimated light rays 110 that are reflected by the second prism 118.

It may be understood by a person skilled in the art that FIG. 1 shows a simplified implementation of the light-emitting element 100, for sake of clarity, which should not unduly limit the scope of the claims herein. The person skilled in the art will recognize many variations, alternatives, and modifications of embodiments of the present disclosure. For example, there could alternatively be more than one collimator 106, first prism 108, half-wave plate 116 and second prism 118 arranged around the light source 102.

FIGS. 2A-2H show simplified top views of exemplary light-emitting elements 200A, 200B, 200C, 200D, 200E, 200F, 200G, 200H, in accordance with various embodiments of the present disclosure. The light-emitting elements 200A, 200B, 200C, 200D, 200E, 200F, 200G, 200H comprise a light source 202 configured to emit light rays laterally relative to an optical axis of the corresponding light-emitting element 200A, 200B, 200C, 200D, 200E, 200F, 200G, 200H. The light rays are emitted laterally in at least one direction. The at least one direction includes a first direction O-A, a second direction O-B opposite to the first direction O-A, a third direction O-C and a fourth direction O-D opposite to the third direction O-C.

The light-emitting elements 200A, 200B, 200C, 200D, 200E, 200F, 200G, 200H also comprise at least one collimator (204a, 204b, 204c, 204d) arranged in the first direction, the second direction O-B, the third direction O-C and/or the fourth direction O-D respectively. The light-emitting elements 200A, 200B, 200C, 200D, 200E, 200F, 200G, 200H further comprise at least one first prism (206a, 206b, 206c, 206d) arranged on said optical path after at least one collimator 204a, 204b, 204c, 204d, respectively, configured to reflect a given portion of the collimated light rays having one of a first polarization orientation and a second polarization orientation along the optical axis of the corresponding light-emitting element 200A, 200B, 200C, 200D, 200E, 200F, 200G, 200H and to transmit another portion of the collimated light rays having another of the first polarization orientation and the second polarization orientation. For illustrative purposes, the first polarization orientation and the second polarization orientation are associated with S-polarization and the third polarization orientation and the fourth polarization orientation are associated with T-polarization selective prism. However, it will be appreciated that the first polarization orientation and the second polarization orientation can be associated with the T-polarization selective prism and the third polarization orientation and the fourth polarization orientation can be associated with the S-polarization selective prism without departing from a scope of the present disclosure. Thus, the first prisms 206a and 206b reflect light rays associated with S-polarization selective prism while reflecting light rays associated with T-polarization selective prism. Moreover, the first prisms 204c and 204d reflect light rays associated with T-polarization selective prism while reflecting light rays associated with S-polarization selective prism. However, it will be appreciated that the first polarization orientation and the second polarization orientation are interchangeable, such that the first polarization orientation and second polarization orientation may be associated with T-polarization selective prism, while the third polarization orientation and the fourth polarization orientation may be associated with S-polarization selective prism, or vice versa. The arrangement of the first prisms is such that the polarization state of the collimated light rays remains consistent along specific directional paths. In particular, the polarization state of the collimated light rays traveling in the first direction and the second direction O-B is maintained to be the same, while the polarization state of the collimated light rays traveling in the third direction O-C and the fourth direction O-D is also maintained to be the same. This configuration allows the polarization-dependent reflections and transmissions occurring at the first and second prisms to function as intended, facilitating the efficient manipulation of light within the backlight unit.

Figure 2A:
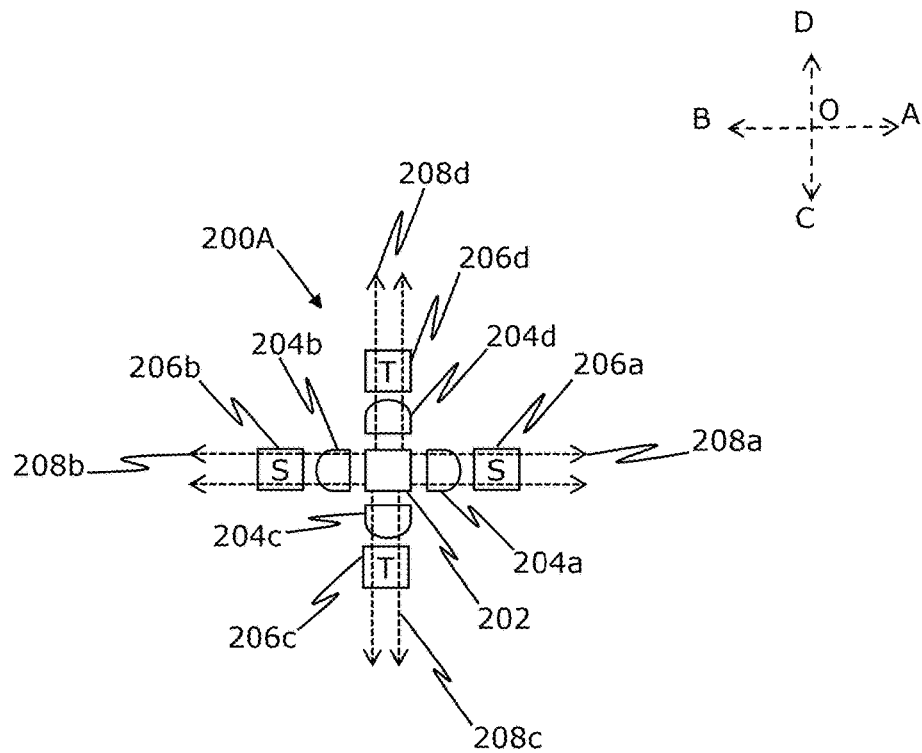

FIG. 2A shows the simplified top view of the light-emitting element 200A comprising the light source 202, the collimator 204a arranged in the first direction O-A, the collimator 204b arranged in the second direction O-B, the collimator 204c arranged in the third direction O-C and the collimator 204d arranged in the fourth direction O-D. As shown, the first prism 206a is arranged on the optical path 208a after the collimator 204a, the first prism 206b is arranged on the optical path 208b after the collimator 204b, the first prism 206c is arranged on the optical path 208c after the collimator 204c and the first prism 206d is arranged on the optical path 208d after the collimator 204d. The first prisms 206c, 206d reflect portion of the collimated rays having the second polarization orientation and transmit portion of the collimated rays having the first polarization orientation. As shown, the first prisms 206c, 206d reflect the collimated light rays having the T-polarization selective prism while transmitting the collimated light rays having the S-polarization selective prism. Moreover, the first prisms 206a, 206b reflect portion of the collimated rays having the first polarization orientation and transmit portion of the collimated rays having the second polarization orientation. As shown, the first prisms 206a, 206b reflect the collimated light rays having the S-polarization selective prism while transmitting the collimated light rays having the T-polarization selective prism.

Figure 2B:
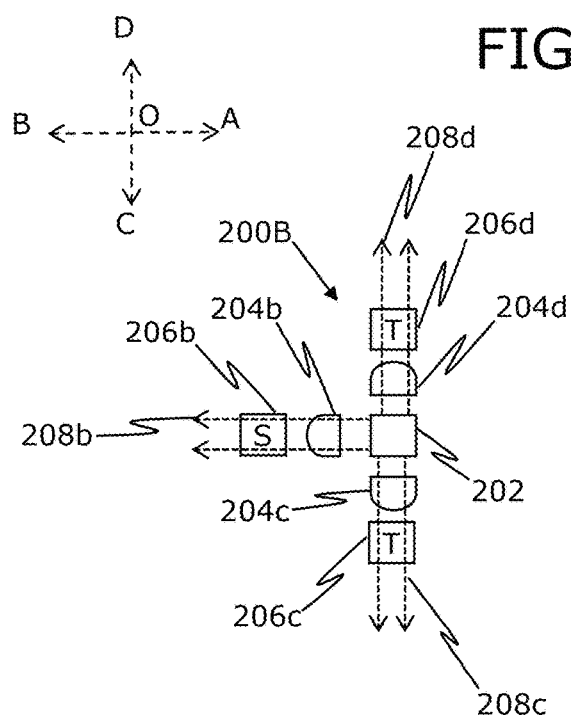

FIG. 2B shows the simplified top view of the light-emitting element 200B comprising the light source 202, the collimator 204b arranged in the second direction O-B, the collimator 204c arranged in the third direction O-C and the collimator 204d arranged in the fourth direction O-D. As shown, the first prism 206b is positioned on the optical path 208b after the collimator 204b, the first prism 206c is positioned on the optical path 208c after the collimator 204c and the first prism 206d is positioned on the optical path 208d after the collimator 204d. The first prisms 206c, 206d reflect a portion of the collimated rays having the second polarization orientation and transmit a portion of the collimated rays having the first polarization orientation. As shown, the first prisms 206c, 206d reflect the collimated light rays having the T-polarization selective prism while transmitting the collimated light rays having the S-polarization selective prism. Additionally, the first prism 206b reflects a portion of the collimated rays having the first polarization orientation and transmits a portion of the collimated rays having the second polarization orientation. As shown, the first prisms 206b reflects the collimated light rays having the S-polarization selective prism while transmitting the collimated light rays having the T-polarization selective prism. It may be understood by a person skilled in the art that FIG. 2B shows a simplified implementation of the light-emitting element 200B, for sake of clarity, which should not unduly limit the scope of the claims herein. The person skilled in the art will recognize many variations, alternatives, and modifications of embodiments of the present disclosure. For example, the collimator 204b arranged in the second direction O-B can be replaced with the collimator 204a arranged in the first direction O-A. Further, the first prism 206b positioned on the optical path 208b after the collimator 204b can be replaced with the first prism 206a positioned on the optical path 208a after the collimator 204a.

Figure 2C:
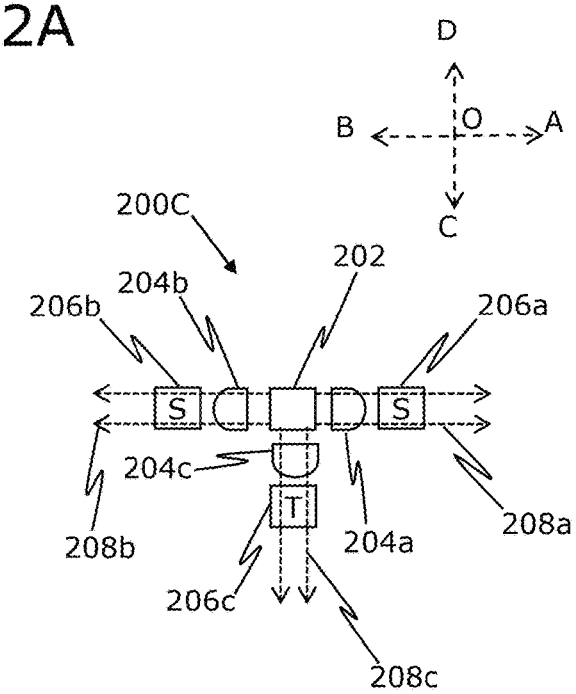

FIG. 2C shows the simplified top view of the light-emitting element 200C comprising the light source 202, the collimator 204a arranged in the first direction O-A, the collimator 204b arranged in the second direction O-B and the collimator 204d arranged in the fourth direction O-D. As shown, the first prism 206a is positioned on the optical path 208a after the collimator 204a, the first prism 206b is positioned on the optical path 208b after the collimator 204b and the first prism 206c is positioned on the optical path 208c after the collimator 204c. As shown, the first prism 206c reflects the collimated light rays having the T-polarization selective prism while transmitting the collimated light rays having the S-polarization selective prism. The first prism 206d reflects a portion of the collimated rays having the second polarization orientation and transmits a portion of the collimated rays having the first polarization orientation. Additionally, the first prisms 206a, 206b reflect a portion of the collimated rays having the first polarization orientation and transmit a portion of the collimated rays having the second polarization orientation. As shown, the first prisms 206a, 206b reflect the collimated light rays having the S-polarization selective prism while transmitting the collimated light rays having the T-polarization selective prism. FIG. 2C shows a simplified implementation of the light-emitting element 200C, for sake of clarity, which should not unduly limit the scope of the claims herein. The person skilled in the art will recognize many variations, alternatives, and modifications of embodiments of the present disclosure. For example, the collimator 204c arranged in the third direction O-C can be replaced with the collimator 204d arranged in the fourth direction O-D. Moreover, the first prism 206c positioned on the optical path 208c after the collimator 204c can be replaced with the first prism 206d positioned on the optical path 208d after the collimator 204d.

FIG. 2D shows the simplified top view of the light-emitting element 200D comprising the light source 202, the collimator 204c arranged in the third direction O-C and the collimator 204d arranged in the fourth direction O-D. As shown, the first prism 206c is positioned on the optical path 208c after the collimator 204c and the first prism 206d is positioned on the optical path 208d after the collimator 204d. The first prisms 206c, 206d reflect a portion of the collimated rays having the first polarization orientation and transmit a portion of the collimated rays having the second polarization orientation. As shown, the first prisms 206c, 206d reflect the collimated light rays having the T-polarization selective prism while transmitting the collimated light rays having the S-polarization selective prism. FIG. 2D shows a simplified implementation of the light-emitting element 200D, for sake of clarity, which should not unduly limit the scope of the claims herein. The person skilled in the art will recognize many variations, alternatives, and modifications of embodiments of the present disclosure. For example, the first prisms 206c, 206d can be configured to reflect the collimated light rays having the S-polarization selective prism while transmitting the collimated light rays having the T-polarization selective prism, without departing from a scope of the present disclosure.

FIG. 2E shows the simplified top view of the light-emitting element 200E comprising the light source 202, the collimator 204a arranged in the first direction O-A and the collimator 204b arranged in the second direction O-B. As shown, the first prism 206a is positioned on the optical path 208a after the collimator 204a and the first prism 206b is positioned on the optical path 208b after the collimator 204b. The first prisms 206a, 206b reflect a portion of the collimated rays having the second polarization orientation and transmits a portion of the collimated rays having the first polarization orientation. As shown, the first prisms 206a, 206b reflect the collimated light rays having the S-polarization selective prism while transmitting the collimated light rays having the T-polarization selective prism. FIG. 2E shows a simplified implementation of the light-emitting element 200E, for sake of clarity, which should not unduly limit the scope of the claims herein. The person skilled in the art will recognize many variations, alternatives, and modifications of embodiments of the present disclosure. For example, the first prisms 206a, 206b can be configured to reflect the collimated light rays having the T-polarization selective prism while transmitting the collimated light rays having the S-polarization selective prism, without departing from a scope of the present disclosure.

FIG. 2F shows the simplified top view of the light-emitting element 200F comprising the light source 202, the collimator 204a arranged in the first direction O-A and the collimator 204c arranged in the third direction O-C. As shown, the first prism 206a is positioned on the optical path 208a after the collimator 204a and the first prism 206c is positioned on the optical path 208c after the collimator 204c. The first prisms 206a reflects a portion of the collimated rays having the second polarization orientation and transmits a portion of the collimated rays having the first polarization orientation. As shown, the first prism 206a reflects the collimated light rays having the S-polarization selective prism while transmitting the collimated light rays having the T-polarization selective prism. Additionally, the first prism 206c reflects a portion of the collimated rays having the first polarization orientation and transmits a portion of the collimated rays having the second polarization orientation. As shown, the first prisms 206c reflects the collimated light rays having the T-polarization selective prism while transmitting the collimated light rays having the S-polarization selective prism. FIG. 2F shows a simplified implementation of the light-emitting element 200F, for sake of clarity, which should not unduly limit the scope of the claims herein. The person skilled in the art will recognize many variations, alternatives, and modifications of embodiments of the present disclosure. For example, the collimator 204a arranged in the first direction O-A can be replaced with the collimator 204b arranged in the second direction O-B. Thus, the first prism 206a positioned on the optical path 208a after the collimator 204a can be replaced with the first prism 206b positioned on the optical path 208b after the collimator 204b. Moreover, the collimator 204c arranged in the third direction O-C can be replaced with the collimator 204d arranged in the fourth direction O-D. Thus, the first prism 206c positioned on the optical path 208c after the collimator 204c can be replaced with the first prism 206d positioned on the optical path 208d after the collimator 204d. Similarly, the light-emitting element 200F can comprise the light source 202, the collimator 204a arranged in the first direction O-A and the collimator 204d arranged in the fourth direction O-D. Consequently, the first prism 206a can be positioned on the optical path 208a after the collimator 204a and the first prism 206d can be positioned on the optical path 208d after the collimator 204d. Moreover, the light-emitting element 200F can comprise the light source 202, the collimator 204b arranged in the second direction O-B and the collimator 204c arranged in the third direction O-C. Thus, the first prism 206b can be positioned on the optical path 208b after the collimator 204b and the first prism 206c can be positioned on the optical path 208c after the collimator 204c.

Figure 2G:
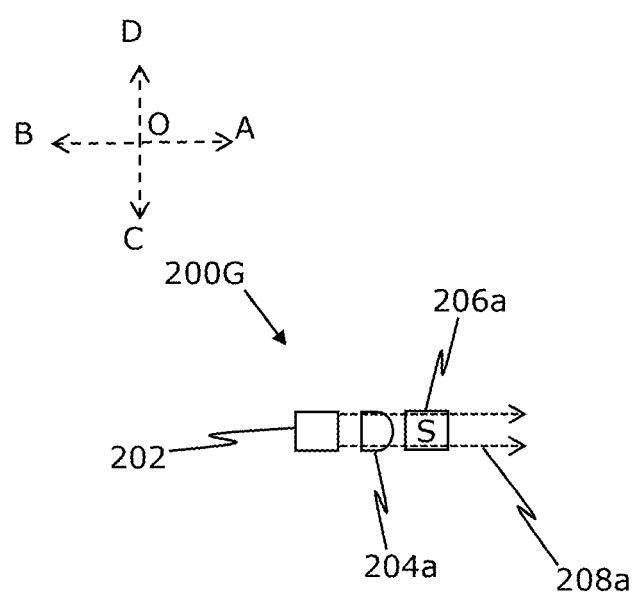

FIG. 2G shows the simplified top view of the light-emitting element 200G comprising the light source 202 and the collimator 204a arranged in the first direction O-A. As shown, the first prism 206a is positioned on the optical path 208a after the collimator 204a. The first prism 206a reflects a portion of the collimated rays having the second polarization orientation and transmits a portion of the collimated rays having the first polarization orientation. As shown, the first prism 206a reflects the collimated light rays having the S-polarization selective prism while transmitting the collimated light rays having the T-polarization selective prism.

It may be understood by a person skilled in the art that FIG. 2G shows a simplified implementation of the light-emitting element 200G, for sake of clarity, which should not unduly limit the scope of the claims herein. The person skilled in the art will recognize many variations, alternatives, and modifications of embodiments of the present disclosure. For example, the collimator 204a arranged in the first direction O-A can be replaced with the collimator 204b arranged in the second direction O-B. Further, the first prism 206a arranged in the first direction O-A can be replaced with the first prism 206b arranged in the second direction O-B. Additionally, more than one collimator and first prism can be arranged around the light source 202.

Figure 2H:
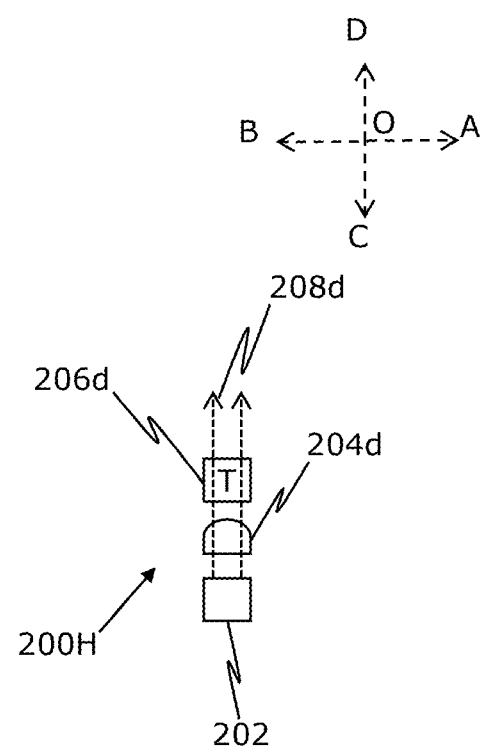

FIG. 2H shows the simplified top view of the light-emitting element 200H comprising the light source 202 and the collimator 204d arranged in the fourth direction O-D. As shown, the first prism 206d is positioned on the optical path 208d after the collimator 204d. The first prism 206d reflects a portion of the collimated rays having the first polarization orientation and transmit a portion of the collimated rays having the second polarization orientation. As shown, the first prisms 206d reflects the collimated light rays having the T-polarization selective prism while transmitting the collimated light rays having the S-polarization selective prism.

It may be understood by a person skilled in the art that FIG. 2H shows a simplified implementation of the light-emitting element 200H, for sake of clarity, which should not unduly limit the scope of the claims herein. The person skilled in the art will recognize many variations, alternatives, and modifications of embodiments of the present disclosure. For example, the collimator 204d arranged in the fourth direction O-D can be replaced with the collimator 204c arranged in the third direction O-C. Further, the first prism 206d arranged in the fourth direction O-D can be replaced with the first prism 206c arranged in the third direction O-C. Additionally, more than one collimator and first prism can be arranged around the light source 202.

Figure 3:
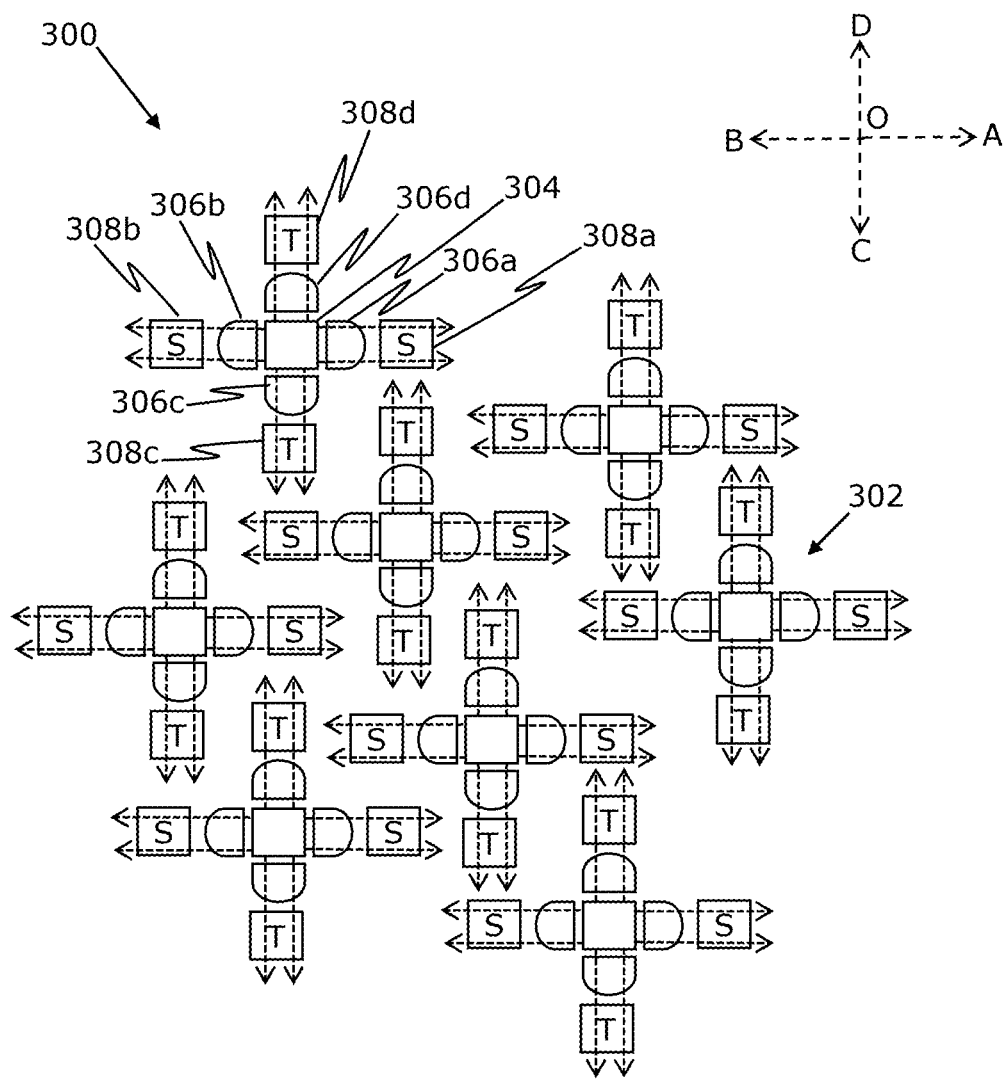
FIG. 3 shows a simplified top view of an array of light-emitting elements in a backlight unit, in accordance with an embodiment of the present disclosure.

FIG. 3 shows a simplified exemplary top view of an array 300 of light-emitting elements 302 of a backlight unit (not shown), in accordance with an embodiment of the present disclosure. Each light-emitting element 302 of the plurality of light-emitting elements comprises a light source 304 configured to emit light rays laterally relative to an optical axis of the backlight unit. The light rays are emitted laterally in at least one direction. The at least one direction includes a first direction O-A, a second direction O-B opposite to the first direction O-A, a third direction O-C and a fourth direction O-D opposite to the third direction O-C.

Each light-emitting elements 302 further comprises at least one collimator 306a, 306b, 306c and 306d arranged in the first direction O-A, the second direction O-B, the third direction O-C and the fourth direction O-D, respectively.

Moreover, each light-emitting element 302 comprises at least one first prism 308a, 308b, 308c, 308d arranged on said optical path after at least one collimator 306a, 306b, 306c, 306d, respectively, configured to reflect a given portion of the collimated light rays having one of a first polarization orientation and a second polarization orientation along the optical axis of the backlight unit and to transmit another portion of the collimated light rays having another of the first polarization orientation and the second polarization orientation. For illustrative purposes, the first polarization orientation is associated with T-polarization selective prism and the second polarization is associated with S-polarization selective prism.

It may be understood by a person skilled in the art that FIG. 3 shows a simplified implementation of the array 300, for sake of clarity, which should not unduly limit the scope of the claims herein. The person skilled in the art will recognize many variations, alternatives, and modifications of embodiments of the present disclosure. For example, the array 300 can be implemented to comprise fewer or higher number of light-emitting elements 302.

Figure 4:
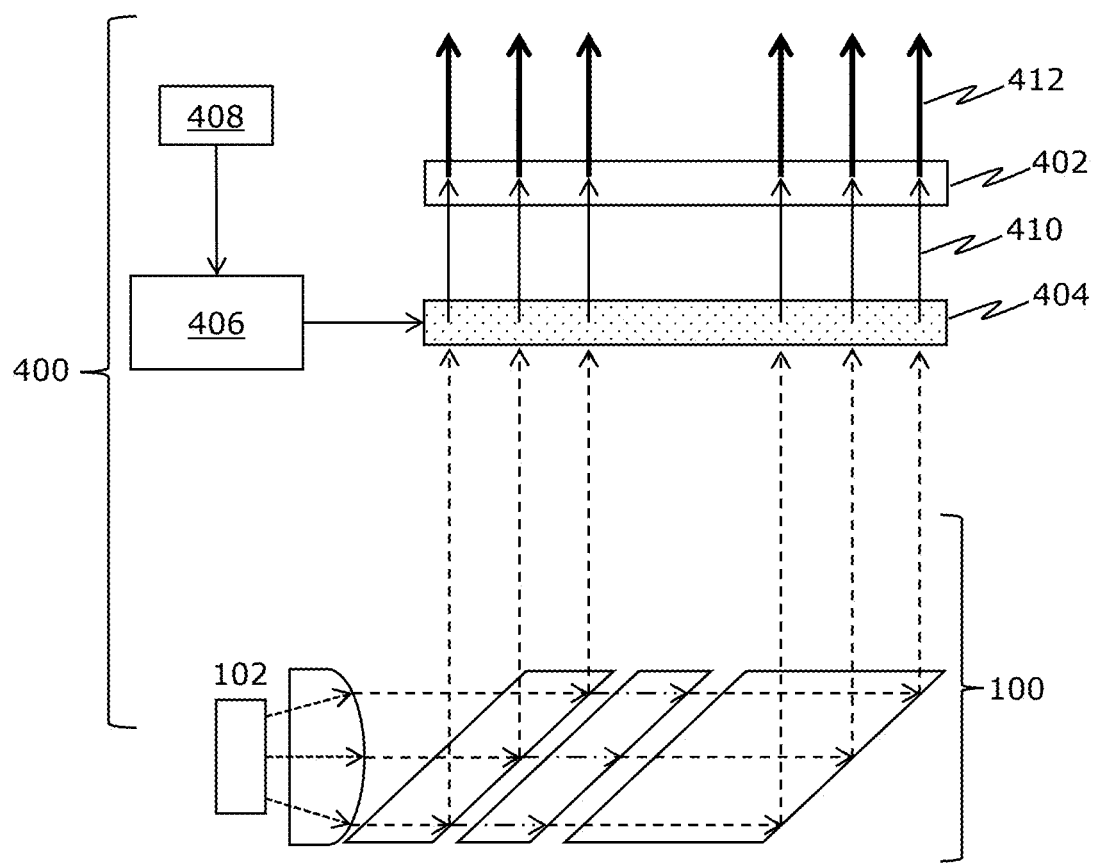
FIG. 4 shows a simplified top view of a liquid crystal display device incorporating the backlight unit, in accordance with an embodiment of the present disclosure.

FIG. 4 shows a simplified top view of a liquid crystal display device 400, in accordance with an embodiment of the present disclosure. The liquid crystal display device 400 comprises the light-emitting element 100 of FIG. 1 and a linear polarizer 402 having the another of the first polarization orientation or the second polarization orientation, arranged on an optical path of the light-emitting element 100. The liquid crystal display device 400 further comprises a liquid crystal (LC) layer 404 arranged between the light-emitting element 100 and the linear polarizer 402, the LC layer 404 comprising a plurality of LC cells (not shown). The six solid arrows 410 propagating from the LC layer 404 indicates polarized light produced by the LC layer 404. Further, the six thick solid arrows 412 propagating from the linear polarizer 402 indicate production of the synthetic light field. The liquid crystal display device 400 also comprises a drive circuit 406 employed to individually control the plurality of LC cells of the LC layer 404 and a processor 408 configured to:

generate drive signals for controlling the plurality of LC cells of the LC layer 404; and send the drive signals to the drive circuit 406, wherein the plurality of LC cells of the LC layer 404 are controlled individually by the drive circuit 406 using the drive signals, to adjust a polarization of light passing therethrough, for producing a synthetic light field.

Figure 5:
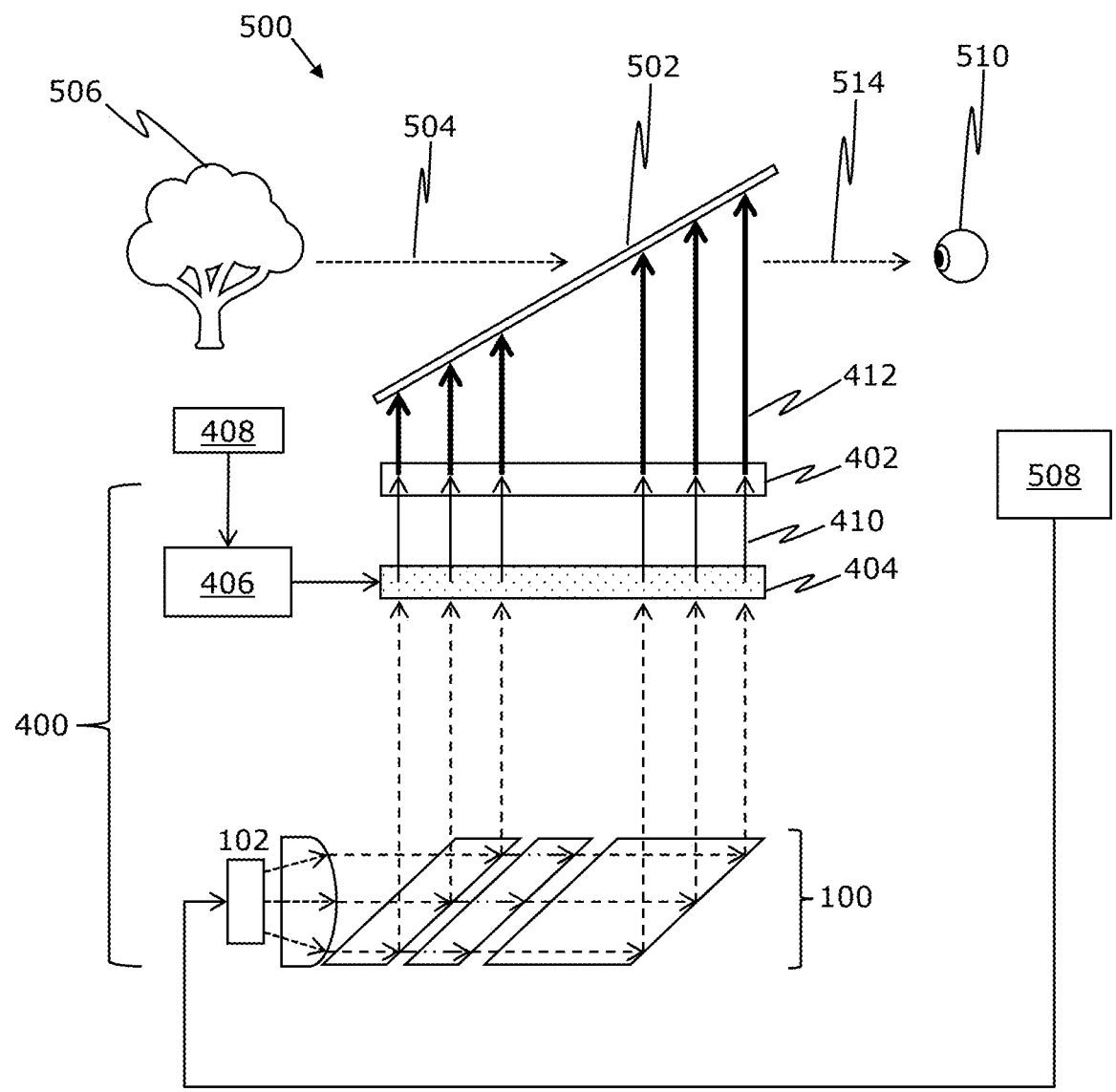
FIG. 5 shows a simplified top view of a system incorporating the liquid crystal display device, in accordance with an embodiment of the present disclosure.

FIG. 5 shows a simplified view of a system 500, in accordance with an embodiment of the present disclosure. The system 500 comprises the liquid crystal display device 400 of FIG. 4. The system 500 further comprises an optical combiner 502 arranged on an optical path of the liquid crystal display device 400 and on an optical path of a real-world light field 504 of a real-world environment 506. Moreover, the system 500 comprises at least one processor 508 configured to:

generate or retrieve an image to be displayed via the liquid crystal display device 400; and send the image to the liquid crystal display device 400, wherein the liquid crystal display device 400 is configured to display the image for producing the synthetic light field 412 and wherein the optical combiner 502 is employed to reflect the synthetic light field 412 towards eyes 510 of at least one user, whilst optically combining the real-world light field 504 with the synthetic light field 412. The optical combination of the real-world light field 504 with the synthetic light field 412 produces optically combined light rays 514 that are transmitted towards the eyes 510 of the at least one user.

The invention claimed is:

1. A backlight unit for a liquid crystal display device, the backlight unit comprising an array of light-emitting elements, wherein a given light-emitting element comprises:

a light source configured to emit light rays laterally relative to an optical axis of the backlight unit, wherein the light rays are emitted laterally in at least one direction;

a collimator arranged on an optical path of light rays emitted in an individual one of the at least one direction, to collimate the light rays;

a first prism arranged on said optical path after the collimator, configured to reflect a given portion of the collimated light rays having one of a first polarization orientation and a second polarization orientation along the optical axis of the backlight unit and to transmit another portion of the collimated light rays having another of the first polarization orientation and the second polarization orientation;

a half-wave plate arranged on said optical path after the first prism, configured to rotate a polarization orientation of the another portion of the collimated light rays from the another of the first polarization orientation and the second polarization orientation to the one of the first polarization orientation and the second polarization orientation; and a second prism arranged on said optical path after the half-wave plate, configured to reflect the another portion of the collimated light rays having the one of the first polarization orientation and the second polarization orientation along the optical axis of the backlight unit.

2. The backlight unit of claim 1, wherein the at least one direction includes a first direction, a second direction, a third direction and a fourth direction, the first direction being opposite to the second direction, the third direction being opposite to the fourth direction, the first direction being perpendicular to the third direction.

3. The backlight unit of claim 2, wherein for the first direction and the second direction, corresponding first prisms are configured to reflect a portion of the collimated light rays having the first polarization orientation and wherein for the third direction and the fourth direction, corresponding first prisms are configured to reflect a portion of the collimated light rays having the second polarization orientation.

4. The backlight unit of claim 1, further comprises a polarization-preserving diffuser arranged on an optical path of the given portion of the collimated light rays and the another portion of the collimated light rays.

5. A liquid crystal display device comprising:

a backlight unit of claim 1;

a linear polarizer having the another of the first polarization orientation and the second polarization orientation, arranged on an optical path of the backlight unit;

a liquid crystal (LC) layer arranged between the backlight unit and the linear polarizer, the LC layer comprising a plurality of LC cells;

a drive circuit employed to individually control the plurality of LC cells of the LC layer; and a processor configured to:

generate drive signals for controlling the plurality of LC cells of the LC layer; and send the drive signals to the drive circuit, wherein the plurality of LC cells of the LC layer are controlled individually by the drive circuit using the drive signals, to adjust a polarization of light passing therethrough, for producing a synthetic light field.

6. The liquid crystal display device of claim 5, further comprising a colour filter array arranged between the LC layer and the linear polarizer.

7. A system comprising:
a liquid crystal display device comprising:
  a backlight unit according to claim 1;
  a linear polarizer having the another of the first polarization orientation and the second polarization orientation, arranged on an optical path of the backlight unit;
  a liquid crystal (LC) layer arranged between the backlight unit and the linear polarizer, the LC layer comprising a plurality of LC cells; and
  a drive circuit employed to individually control the plurality of LC cells of the LC layer;
an optical combiner arranged on an optical path of the liquid crystal display device and on an optical path of a real-world light field of a real-world environment; and
at least one processor configured to:
  generate or retrieve an image to be displayed via the liquid crystal display device; and
  send the image to the liquid crystal display device,
wherein the liquid crystal display device is configured to display the image for producing a synthetic light field and wherein the optical combiner is employed to reflect the synthetic light field towards eyes of at least one user, whilst optically combining the real-world light field with the synthetic light field.

8. The system of claim 7, further comprising a tracker and a multiscopic optical element, wherein the at least one processor is configured to:
  determine a relative location of a first eye and of a second eye of the at least one user with respect to the optical combiner, by utilising the tracker;
  generate the image as a light field image, based on the relative location of the first eye and of the second eye with respect to the optical combiner; and
  control the multiscopic optical element, based on the relative location of the first eye and of the second eye with respect to the optical combiner, to direct light corresponding to a first set of pixels of the light field image and light corresponding to a second set of pixels of the light field image to produce a first part and a second part of the synthetic light field, respectively, for the first eye and the second eye.

* * * * *